(12) United States Patent
Kirschner

(10) Patent No.: US 8,070,113 B1
(45) Date of Patent: Dec. 6, 2011

(54) SWAY BRACE

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 0 days.

(21) Appl. No.: 12/414,561

(22) Filed: Mar. 30, 2009

(51) Int. Cl.
*F16L 3/08* (2006.01)

(52) U.S. Cl. ............. 248/65; 248/62; 248/68.1; 248/58; 248/74.1; 248/230.6; 138/106; 138/107; 24/298; 24/302; 24/19

(58) Field of Classification Search ............. 248/62, 248/65, 56, 72, 58, 74.5, 219.3, 219.4, 230.1, 248/74.1, 230.6, 73, 230.7, 230.9, 231.71, 248/231.81, 68.1; 24/298, 302, 19; 138/106, 138/107

See application file for complete search history.

(56) References Cited

U.S. PATENT DOCUMENTS

| | | | | |
|---|---|---|---|---|
| 780,420 A | 1/1905 | Gross | ............... | 248/70 |
| 1,243,388 A | 10/1917 | Corley | ........... | 248/215 |
| 2,439,062 A * | 4/1948 | Shur | ............... | 248/536 |
| 2,439,063 A * | 4/1948 | Shur | ............... | 248/536 |
| 2,630,074 A | 3/1953 | Grabinski | ........ | 104/112 |
| 2,856,216 A | 10/1958 | Witzel | ........... | 403/225 |
| 2,865,587 A * | 12/1958 | D Azzo | ............ | 248/72 |
| 2,931,605 A | 4/1960 | Kelly | ............ | 248/59 |
| 2,937,226 A | 5/1960 | Kaminski, Jr. | ........ | 174/40 R |
| 2,956,103 A | 10/1960 | Steel | ............ | 174/40 R |
| 3,233,850 A | 2/1966 | Merker et al. | ........ | 248/49 |
| 3,570,794 A | 3/1971 | Kirschner | ....... | 248/74 |
| 3,582,030 A | 6/1971 | Barrett, Jr. | ........ | 248/68.1 |
| 3,884,438 A | 5/1975 | Logsdon | ........... | 248/59 |
| 3,894,707 A * | 7/1975 | Heard | .......... | 248/230.9 |
| 4,094,487 A * | 6/1978 | Heard | .......... | 248/230.9 |
| 4,172,578 A | 10/1979 | Pate | ............ | 248/74.3 |
| 4,288,171 A | 9/1981 | Kottke | .......... | 403/218 |
| 4,697,770 A | 10/1987 | Kirschner | ...... | 248/62 |
| 4,714,218 A | 12/1987 | Hungerford, Jr. | ....... | 248/62 |
| 5,004,193 A | 4/1991 | Kirschner | ...... | 248/59 |
| 5,007,603 A | 4/1991 | Kirschner | ...... | 248/59 |
| 5,072,903 A | 12/1991 | Griffin | .......... | 248/72 |
| 5,111,770 A | 5/1992 | Weelink | ........ | 119/523 |
| 5,145,132 A | 9/1992 | Kirschner | ...... | 248/59 |
| 5,295,646 A | 3/1994 | Roth | ............ | 248/58 |
| 5,323,988 A | 6/1994 | Handler | ........ | 248/49 |
| 5,961,248 A * | 10/1999 | Tourtellotte | ........ | 403/400 |
| 6,062,515 A | 5/2000 | Snyder | .......... | 248/62 |
| 6,227,757 B1 * | 5/2001 | Delouvee et al. | ....... | 403/400 |
| 6,234,277 B1 | 5/2001 | Kaczmarek | ........ | 187/414 |
| 6,250,847 B1 * | 6/2001 | Bingham, Jr. | ........ | 405/184.4 |
| 6,296,211 B1 * | 10/2001 | Snyder | .......... | 248/71 |

(Continued)

OTHER PUBLICATIONS

U.S. Appl. No. 11/445,490, filed Jun. 1, 2006, Kirschner.

(Continued)

*Primary Examiner* — Nkeisha Smith

(74) *Attorney, Agent, or Firm* — Connolly Bove Lodge & Hutz LLP

(57) ABSTRACT

A sway brace including a U-shaped sling with flanges at each end. The flanges are mounted to two mounting fixtures including block bodies and passages therethrough. Mounting surfaces on the fixtures receive the flanges of the U-shaped sling. Threaded members affix the flanges to the mounting surfaces of the mounting fixtures. The sling includes metal strapping formed in a U-shaped curve about an axis perpendicular to the width of the strapping in a manner to create rigidity and strength.

8 Claims, 1 Drawing Sheet

U.S. PATENT DOCUMENTS

| | | | |
|---|---|---|---|
| 6,464,182 B1 * | 10/2002 | Snyder | 248/71 |
| 6,508,441 B1 * | 1/2003 | Kirschner | 248/62 |
| 6,594,869 B1 | 7/2003 | Chen | 24/274 R |
| 6,629,678 B1 | 10/2003 | Kirschner | 248/228.6 |
| 6,802,569 B1 * | 10/2004 | Conard et al. | 301/5.24 |
| 7,516,922 B1 * | 4/2009 | Kirschner | 248/65 |
| 7,523,895 B1 * | 4/2009 | Kirschner | 248/62 |
| 2003/0052235 A1 * | 3/2003 | Heath | 248/62 |
| 2009/0183463 A1 * | 7/2009 | Osborn et al. | 52/745.21 |

OTHER PUBLICATIONS

U.S. Appl. No. 11/556,587, filed Nov. 3, 2006, Kirschner.

* cited by examiner

SWAY BRACE

BACKGROUND OF THE INVENTION

The field of the present invention is bracing for preventing pipes from swaying relative to an associated building structure.

Building codes, as well as competent construction practice, require the securing of fluid lines and other utilities to the structure of a building to brace such lines against damaging movement resulting from seismic disturbances. Sway braces have been designed for securing numerous types of pipes and conduits. An example of such secured lines is fire control water sprinkler distribution pipes. When sprinkler systems are used in buildings, it is required that the water distribution pipes be adequately braced so that, in the event of an earthquake, the pipes will not unduly sway relative to adjacent portions of the building and separate or produce excessive leakage at the pipe joints. Such bracing is not necessarily contemplated for sustaining the full load of the pipe during normal operation. Indeed, the sway brace may actually be loosely fit on the pipe or utility line pending engagement during seismic activity.

One such brace is illustrated in U.S. Pat. No. 6,508,441. More contemporary braces are illustrated in U.S. patent application Ser. No. 11/445,490 to Kirschner and entitled SWAY BRACE AND METHOD FOR SECURING A PIPE OR CONDUIT AGAINST SWAY and U.S. patent application Ser. No. 11/556,587 to Kirschner entitled SWAY BRACE AND METHOD FOR SECURING A PIPE OR CONDUIT AGAINST SWAY, both of which are allowed. The disclosures of this patent and the two pending applications are incorporated herein by reference. Traditionally, sway braces include a mechanism to grip the pipe or conduit and a constraint tie or bracket or fastener to attach to structure with which the pipe or conduit is to have little relative movement.

SUMMARY OF THE INVENTION

The present invention is directed to sway bracing employing a sling, two mounting fixtures and threaded members to attach the sling to the mounting fixtures. The sling includes metal strapping formed in a U-shaped curve about an axis which is perpendicular to the width of the strapping. The strapping receives a pipe or conduit. There are two ends to the strapping with flanges extending to be fixed by the threaded members to the mounting fixtures.

Heretofore, metal strapping has been employed in a U-shaped curve about an axis parallel to the width direction of the strapping to receive the pipe or conduit. In the present instance, the strapping is arranged to present one thin side, or thickness, to the pipe or conduit with the width direction of the strapping extending radially from the pipe or conduit. With this orientation of the strapping, the brace provides substantial rigidity against lateral motion of the pipe or conduit. Strength in the same direction is also increased. Longitudinally of the pipe or conduit, strength in the sway brace is less critical as longitudinal sliding may even occur. At the same time, mounting fixtures from the devices of the two aforementioned Kirschner applications are compatible and the straps can be of the same material, albeit, distinctively formed.

Accordingly, it is a principal object of the present invention to provide an improved sway brace of specific operational capability and compatibility. Other and further objects and advantages will appear hereinafter.

DETAILED DESCRIPTION OF THE PREFERRED EMBODIMENT

Figure 1:
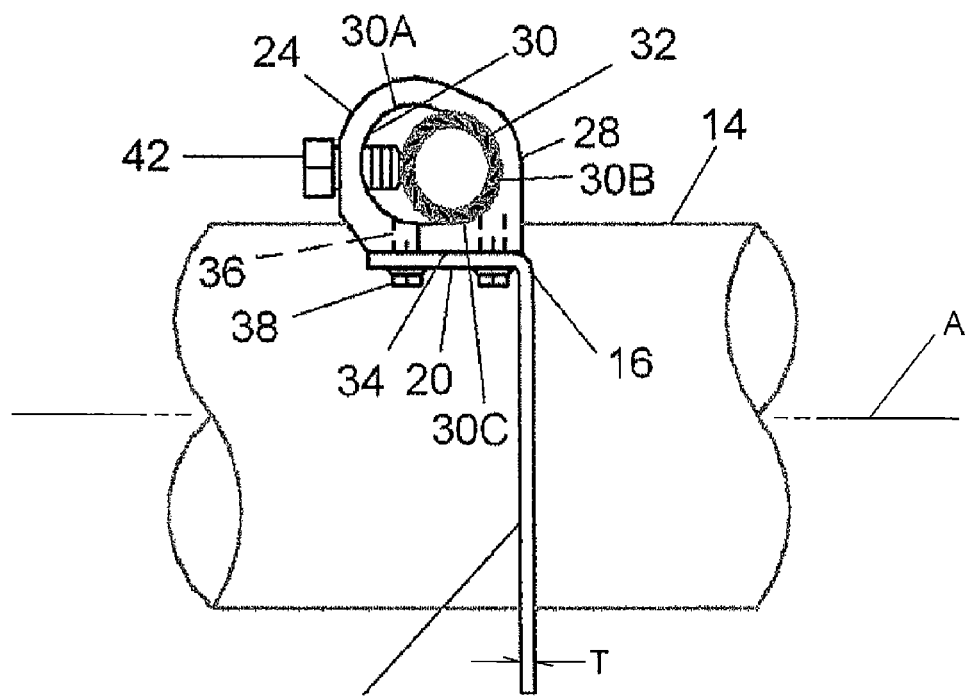
FIG. 1 illustrates a front view of a sway brace.

The Figures illustrate a sway brace including a sling 10. The sling 10 contemplates a specific diameter of pipe to be retained therein. Further, the pipe or conduit is not supported by the sling 10 such that the sling 10 would conform to a constant load. The sling 10 is defined by metal strapping formed in a U-shaped curve 12 about an axis A which is perpendicular to the width direction W of the strapping. Thus, the strapping extends radially in the width direction W from the pipe or conduit 14. The sling 10 is thus configured to receive the pipe or conduit 14 bearing against the thickness direction T of the strapping. The axis A about which the U-shaped curve is formed roughly corresponds to the centerline of the pipe or conduit 14 contemplated to be supported by the sway brace.

The strapping is preferably of commonly available materials of a strength to conform to building standards. Conveniently it may be of the same material contemplated for use in the aforementioned Kirschner applications yet uniquely formed. In the preferred embodiment, steel strapping having a nominal thickness T of ¼" and a nominal width W of 2" or 3" is convenient and available. Strapping is thus contemplated to be material of extended length having a small thickness to width (T/W) ratio, with the current example being 1:8 to 1:12. The strapping may be formed to receive a six inch pipe or conduit, typical in the sprinkler industry. Other sizes are equally accommodated. The strapping has two ends 16, 18 and flanges 20, 22 extending parallel to the axis of the U-shaped curve from the ends 16, 18.

Figure 2:
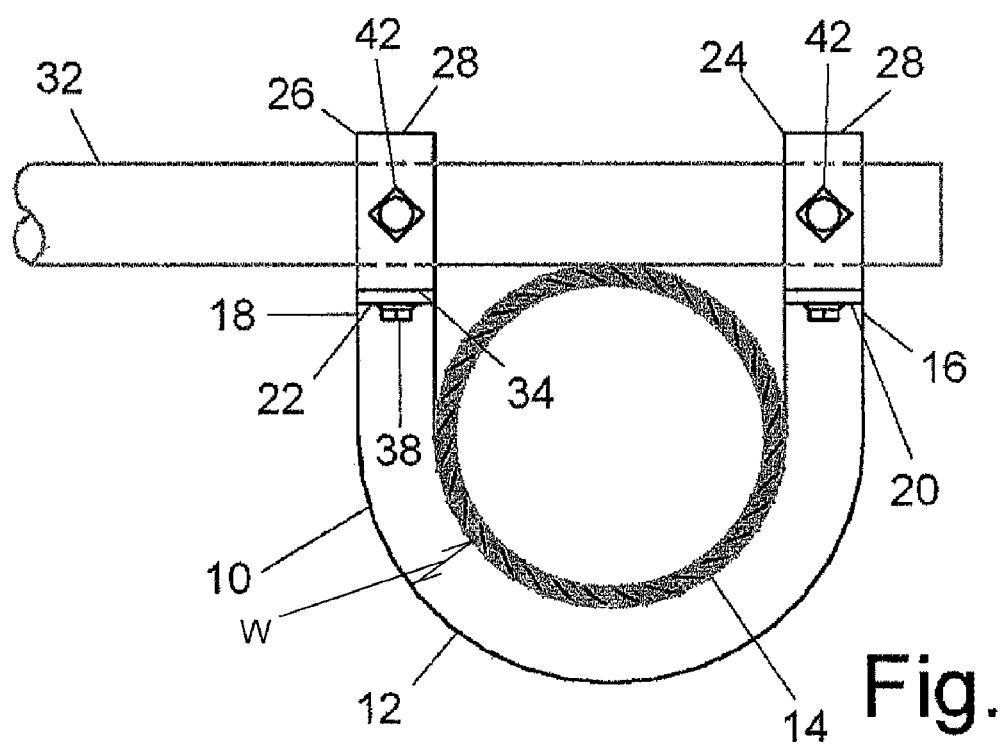
FIG. 2 illustrates a side view of the sway brace of FIG. 1.

A set of two mounting fixtures 24, 26 are contemplated to mate with one sling 10 at the flanges 20, 22. The mounting fixtures 24, 26 each include a block body 28 which is typically cast. A passage 30 extends therethrough. The passage 30 has a cross section normal to its longitudinal extent which is most accurately defined in the preferred embodiment as bounded by a locus of points made up of overlapping circles with one common tangent therebetween. A first circle 30A has a first diameter easily able to receive a rigid tie 32 which may most conveniently be a bar or pipe with a nominal outside diameter which is smaller than the first diameter. A second, smaller circle 30B has a second diameter that is approximately the same as the nominal outside diameter of the rigid tie 32 to be positioned within the passage 30. See the assembly of FIG. 2. A common tangent 30C extends between the circles 30A and 30B to avoid the formation of a ridge between the two circles below the overlap.

Preferably, the circles 30A and 30B overlap to an extent that the smaller circle 30B intersects the larger circle 30A at a point that is diametrically opposed to the point the common tangent 30C intersects the circle 30B. This degree of overlap preserves the greatest circumference of the second circle 30B without forming a ridge into the passage 30 at the intersection of the two circles 30A and 30B on the other side of the passage 30 from the common tangent 30C. This point of overlap also has the relationship that the local tangent to the smaller circle 30B is parallel to the common tangent 30C diametrically opposed across the smaller circle 30B.

The same block body 28 with different sized passages 30 is contemplated for use with different diameter rigid ties 32. The passages 30 of sets of mounting fixtures 24, 26 for accommodating various diameters of rigid tie 32 are all arranged with the distance between the wall of the passage 30 and the sling mounting surface of each block body 26 equal.

One side of the bodies 28 of each of the mounting fixtures 24, 26 defines a mounting surface 34. These mounting surfaces 34 are shown to be parallel to the longitudinal extent of the passages 30 but could also be perpendicular or skewed with appropriate mounting accommodations with the flanges 20, 22 on the ends 16, 18 of the U-shaped sling 10. Tapped holes 36 extend into the mounting surfaces 34. These holes 36 are arranged as can be seen from the orthographic projections of FIGS. 1 and 2. Forces on the sling 10 during use tend to be uniformly distributed at the mounting with the mounting fixtures 24, 26. The block bodies 28 provide the capacity for a closer tolerance on the positioning of the mounting surface 34, a closer tolerance on the distance from that surface to the passage 30 and greater integrity and closer tolerance on the tapped holes 36 than provided by sheet metal formation.

The flanges 20, 22 include two mounting holes therethrough capable of aligning with the tapped holes 36 for receipt of threaded members 38. These threaded members 38 are conventionally threaded bolts which are threadably engaged with the tapped holes 36. The bolts 38 are tightened against the flanges 20, 22 to present an assembled sway brace.

The sway brace is shown in the Figures with additional components facilitating its mounting with the structure of an associated building. A sprinkler pipe or other utility conduit 14 is shown in place within the U-shaped sling 10. The mounting fixtures 24, 26 associated with the U-shaped sling 10 are also shown in assembly with the rigid tie 32 which is most conveniently a pipe. Set screws 42 retain the mounting fixtures 20, 22 by extending through the bodies 24 to lock against the rigid tie 32. These set screws 42 have square heads for purpose of using a wrench for greater holding ability than provided by a head accommodating a screw driver.

The set screws 42 extend through each block body 28 into the passage 30 parallel to the pipe or conduit. Each set screw 42 is arranged across the large circle 30A from the small circle 30B as the smaller circle 30B is displaced from concentricity with the first circle in a direction away from the set screw 42. By the set screws 42 and the smaller circles 30B of the passages 30 being arranged relative to the U-shaped sling 10 as they are, the passages 30 receive the rigid tie 32 snuggly within the smaller circles 30B under influence of the set screws 42. Movement of the rigid tie 32 is thus snugly constrained through about one half of its surface area within the passages 30, within the portion defined by the smaller circles 30B as held by the set screws 42, rather than by line contact in an oversize passage and point contact by a set screw.

To place the constraining rigid tie 32 close to the constrained pipe 14, the distance between the mounting surface 34 and the passage 30 is added to the depth of the U-shaped sling 10 to establish a close fit. As noted earlier, the mounting fixtures 22, 24 are constructed with a common distance between the small diameter portion 30B of the passage 30 and the mounting surface 34 regardless of the size of the passage 30 as may be required to accommodate the rigid tie 32. This feature establishes the correct fit for the constrained pipe 14 with the U-shaped sling 10 selected with an inside curvature appropriate for the preselected outside diameter of the pipe 14. This correct fit is established regardless of the diameter of the constraining rigid tie 32. As such, a single strap size is employable with any of several block bodies 28 configured for different diameter rigid ties 32. The oversize of the larger circle portion 30A of the passage 30 to the rigid tie 32 is not of consequence as the set screws 42 force the constraining tie 32 into the closely fitting smaller circle portion 30B of the passage 30. Upon tightening the set screws 42, the brace tightens up on the rigid tie 32 and achieves a snug fit about the pipe 14.

This system provides a structure and method by which strap elements may be associated with mounting fixtures specifically selected for a given tie which is typically a length of pipe from one inch to two inches in diameter. The threaded members mounting the U-shaped sling to the mounting fixtures are symmetrically arranged relative to the centerline of the passage and spaced apart to accommodate various passage sizes as may be necessary to receive various sizes of pipe. In this way, versatile supply may be maintained to accommodate various sizes of constraining pipe upon which the sway brace is mounted to various sizes of constrained pipe or utility conduit.

Accordingly, an improved sway brace has been shown and described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A sway brace comprising
    a sling including metal strapping having a strapping width and strapping thickness, the width being substantially greater than the thickness, the metal strapping being formed in a U-shaped curve about an axis perpendicular to the width of the strapping to receive a pipe or conduit, the metal strapping having two ends and flanges extending parallel to the axis from the ends, respectively;
    two mounting fixtures, each mounting fixture including a block body, a passage extending through the block body, and an outer mounting surface;
    threaded members affixing the flanges to the mounting fixtures in juxtaposition with the mounting surfaces, respectively, the passages of the block bodies being aligned.

2. The sway brace of claim 1, the block bodies being castings.

3. The sway brace of claim 1 further comprising setscrews extending through the block bodies into the passages, respectively.

4. The sway brace of claim 3 further comprising
    a rigid tie extending through the passage in each mounting fixture, the setscrews extendable to engage the tie and hold the tie against a side of the passages.

5. The sway brace of claim 4, the rigid tie being a pipe.

6. The sway brace of claim 1, each threaded member being a threaded bolt, the flanges each having two mounting holes therethrough to receive the bolts and the block bodies having tapped holes through the mounting surfaces to threadably receive the bolts.

7. The sway brace of claim 1, the flanges extending parallel to one another.

8. The sway brace of claim 1, the strapping having a thickness to width ratio of between about 1:8 to 1:12

* * * * *